UNITED STATES PATENT OFFICE.

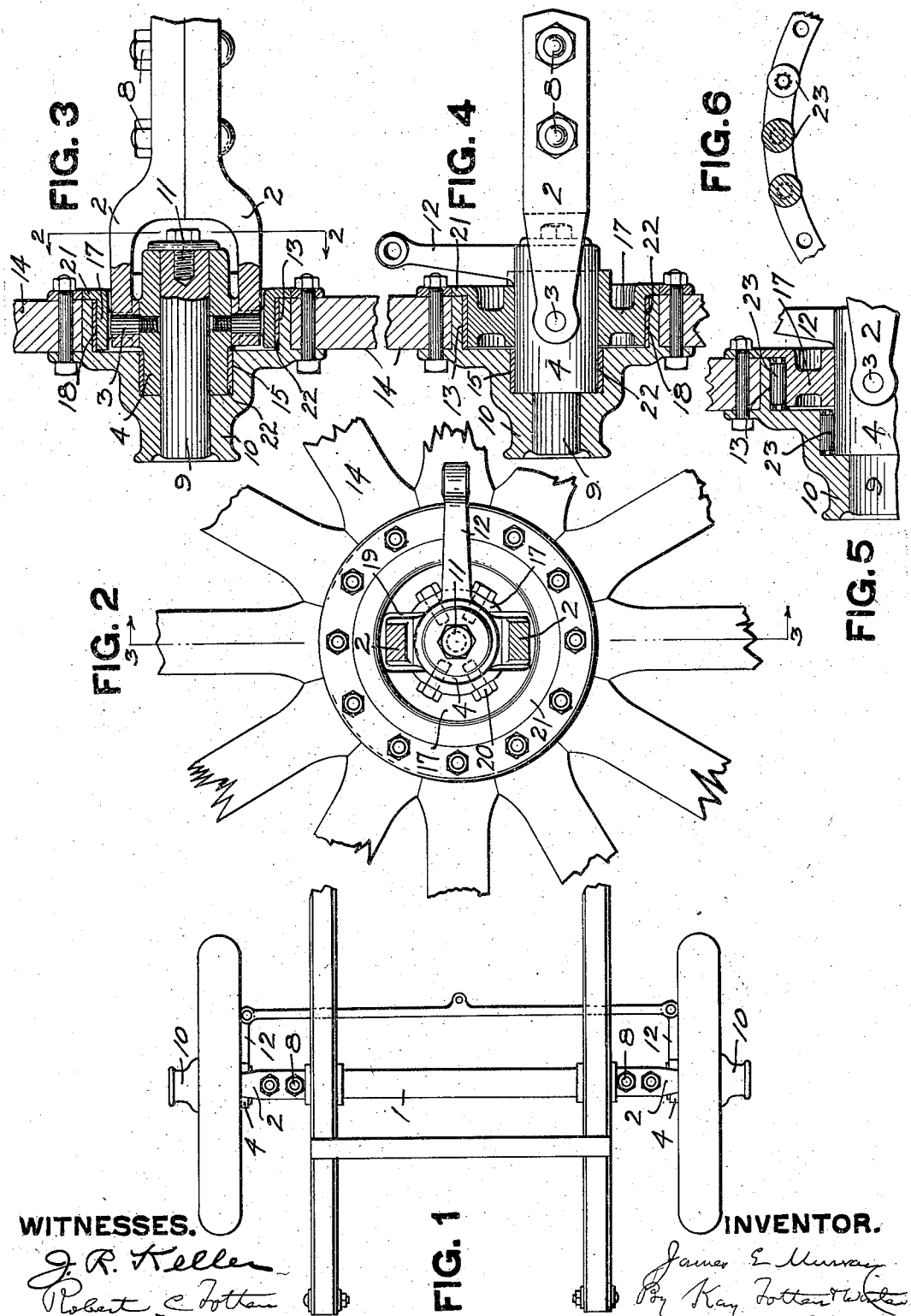

JAMES E. MURRAY, OF McKEESPORT, PENNSYLVANIA.

VEHICLE WHEEL AND AXLE.

No. 857,296.  Specification of Letters Patent.  Patented June 18, 1907.

Application filed October 17, 1906. Serial No. 339,374.

*To all whom it may concern:*

Be it known that I, JAMES E. MURRAY, a resident of McKeesport, in the county of Allegheny and State of Pennsylvania, have invented a new and useful Improvement in Vehicle Wheels and Axles; and I do hereby declare the following to be a full, clear, and exact description thereof.

This invention relates to vehicle wheels and axles, and especially to that class in which the wheel journal is hinged to the axle for the purpose of steering the vehicle, as is the case with motor vehicles.

The object of the invention is to provide a vehicle wheel and axle of this character which is very much stronger and more enduring than those ordinarily used, this being done by providing a very large amount of bearing surface between the wheel and axle journal member.

In all motor vehicles the front axles have the wheel journals or skeins hinged to the axle proper on vertical pivots, said skeins or journals being connected to the steering handle by a series of levers, and the steering being accomplished by changing the angle of these journals or skeins with reference to the axle. In most prior constructions the hinge pivots of the wheel journals or skeins are located a considerable distance inside of the wheel base. As a consequence considerable strain is placed upon these pivots, thus tending to bend them and permitting the wheels to spread apart at their bottoms and to tip inwardly at their tops. When this occurs the parts of the steering gear bind, thus making the vehicle hard to steer. Furthermore, with such prior construction the turning of the wheels at an angle necessitates rolling them slightly over the ground and upon rough ground this is hard to do. Furthermore, when the wheel strikes an obstruction at high speed, there is a tendency to swing the skein or journal on the pivot, thus giving a severe shock to the chauffeur, and in some cases this has been known to entirely jerk the steering lever out of his hands so that he loses control of the car.

In prior constructions the wheel journal is usually in the form of a sleeve surrounding a short spindle fixed centrally in the wheel hub. By reason of the construction the spindle is necessarily of small diameter and all of the wear is brought directly upon the small bearing surfaces of the spindle and the inside of the bearing sleeve. The consequence is that these parts wear very rapidly.

The object of my invention is to overcome the foregoing difficulties, and the invention consists, as heretofore stated, in so forming the hub and wheel journal that a very large amount of bearing surface is provided.

In the accompanying drawings Figure 1 is a plan view of a portion of a vehicle and the front wheels, showing my invention applied thereto; Fig. 2 is a vertical cross section through the axle on line 2—2 Fig. 3; Fig. 3 is a vertical section through the wheel and longitudinal of the axle; Fig. 4 is a horizontal section longitudinally through the axle and wheel; Fig. 5 is a similar section showing a modification; and Fig. 6 is a detail sectional view of the roller bearing.

The axle 1 may be of any desired construction, being either double or forked at its ends as shown, so as to provide upper and lower arms 2. The ends of these arms are provided with openings into which project bosses or trunnions 3, either studs screwed into the wheel bearing or formed integral with the wheel journal or bearing 4. The axle is either split or one of its arms is a separate piece and connected by means of bolts 8 in order to permit the insertion of the journal or bearing with integral trunnions between the arms.

The journal or bearing 4 might be made solid and project into the wheel hub in a well understood manner, but I prefer to make the same in the form of a sleeve as shown, for receiving a spindle 9 connected to the hub 10. The spindle 9 rotates within the hollow bearing, 4, and is held in position by a suitable washer and tap bolt 11, or other suitable means. This spindle may project inwardly and have connected thereto driving mechanism when the vehicle is provided with a front wheel drive. Connected to the bearing 4 is an arm 12, which in turn is connected by the usual rods or links to the steering lever.

The hub of the wheel is provided with a very large recess 13 in the plane of the spokes 14, and with a smaller recess 15 extending outwardly beyond the plane of said spokes. The spindle 9 is located centrally of these recesses and the outer faces of these recesses are accurately formed so as to provide bearing faces. The recess 15 is of sufficient depth so that a bearing sleeve 4 of sufficient ength to form a practical bearing can be used, said sleeve projecting into the recess 15 sufficiently far to bring the trunnions 3 substantially in the plane of the wheel base; that is, in the plane of the spokes 14, the wheel base being the rim at the ends of said spokes. The recess 15 is substantially cylindrical and the bearing sleeve 4 has a neat rotary fit in the same.

Formed on or secured to the bearing sleeve 4 is a disk 17 having its outer periphery formed with a wide bearing face 18, which bears against the outer face of the recess 13, thus forming a third bearing of very large diameter. Consequently, the spindle 9 is very largely relieved of shearing strains and the wear is transferred from said spindle and the smaller inner surface of the sleeve to the larger external surface of said sleeve 4 and disk 17. The disk 17 may be an integral part of the bearing sleeve, 4, being cut away as at 19 to provide room for the trunnions 3 and ends of the axle arms 2. Preferably, however, it is a separate piece as shown, suitably secured to the bearing sleeve, as by the tap screws 20. It is provided with a flange 21 extending up at the rear face of the hub to exclude dust and dirt.

By reason of the bearings formed at 13 and 15, practically all shearing or bending strains and wear are transferred from the spindle to the larger bearing surfaces, so that obviously the wear is reduced to a minimum and danger of bending the parts is entirely overcome. The trunnions or pivots 3 are directly in line with the wheel base and with the large bearing surface at 13, so that these trunnions are not subjected to any bending strains. The recesses 13 and 15 are provided with suitable bushings 22 of brass or other metal having a low co-efficient of friction, and also if desired these bushings may be provided with roller bearings 23, as shown in Figs. 5 and 6, to further reduce wear and friction.

The vehicle will be steered in the usual manner by swinging the bearings 4 on the pivots or trunnions 3. Inasmuch as these trunnions are substantially in the plane of the wheel base, they are subject to no bending strain due to the weight of the vehicle. Consequently the wheel will always remain in true vertical position and not tip inwardly at the top as in the old constructions. Furthermore, by reason of such location of these pivots, in swinging the wheel it will merely pivot on a point instead of rolling over the ground. The very large bearing surface between said journal and the wheel hub reduces friction and wear and also prevents bending of the small spindle which it is necessary to use in vehicles of this kind. The consequence is that the vehicle is easy to steer, there is no danger of losing control of the machine, and the repairs on this part of the machine are reduced to a minimum.

It is obvious that the shape, dimensions and arrangement of parts may be widely varied without departing from the spirit of the invention as herein described and claimed.

What I claim is:

1. In a vehicle, the combination of an axle, a wheel provided with a recessed hub and with a spindle located centrally in said recess, and a sleeved wheel journal hinged to the axle and surrounding the wheel spindle and projecting into the recess of the hub and having a bearing against the walls of said recess.

2. In a vehicle, the combination of an axle, a wheel provided with a recessed hub and a spindle located centrally in said recess, and a sleeved wheel journal hinged to the axle on vertical pivots located substantially in the plane of the wheel base, said journal surrounding the wheel spindle and projecting into the recessed hub and having a bearing against the walls of said recess.

3. In a vehicle, the combination of an axle, a wheel hub having a bearing face in the plane of the spokes, and a spindle located centrally of said bearing face, a sleeved wheel journal hinged to the axle on a vertical pivot and provided with a bearing face contacting with the bearing face in the hub.

4. In a vehicle, the combination of an axle, a wheel provided with a recessed hub having a bearing face in the plane of the spokes, a wheel journal hinged to the axle on vertical pivots located substantially in the plane of the spokes and provided with a bearing face on a larger radius than said pivots and contacting with the bearing face in the hub.

5. In a vehicle, the combination of an axle, a wheel provided with a hub hollow in the plane of the spokes and having a contracted recess extending outside of said plane, a wheel spindle in the hub recess located centrally thereof, and a sleeved wheel journal hinged to the axle and projecting into the recess of the hub with the trunnions located substantially in the plane of the spokes, said journal surrounding the wheel spindle and its outer end having a bearing in the contracted hub recess.

6. In a vehicle, the combination of an axle, a wheel provided with a hub having a large recess in the plane of the spokes and a contracted recess extending outside of said plane, a wheel spindle on said hub located centrally of said recesses, a sleeved wheel journal hinged to the axle and surrounding the wheel spindle and having one bearing fitting in the large recess in the plane of the spokes and another bearing fitting in the contracted recess outside of the plane of said spokes.

7. In a vehicle, the combination of an axle, a wheel provided with spokes and with a hub hollow in the plane of the spokes and having a contracted recess extending outside of said plane, and a wheel journal hinged to the axle on a vertical pivot and projecting into the recessed hub with said pivots lying substantially in the plane of the spokes, said wheel journal having its end bearing in the recess in the hub outside of the plane of the spokes and having a bearing face outside of the trunnions and contacting with outer face of the hub recess in the plane of the spokes.

8. In a vehicle, the combination of an axle, a wheel provided with a recessed hub having a bearing face in the plane of the spokes and with a spindle located centrally in said recess, a sleeved wheel journal hinged to the axle on vertical pivots located substantially in the plane of the spokes and surrounding the wheel spindle, and a disk on said sleeved wheel journal and provided with a bearing face outside of the pivots and contacting with the bearing face in the hub.

In testimony whereof, I the said JAMES E. MURRAY have hereunto set my hand.

JAMES E. MURRAY.

Witnesses:
F. W. WINTER,
ROBERT C. TOTTEN.